(No Model.)　　　　　　　　　　　　　　　　2 Sheets—Sheet 2.
J. D. CLEEK.
HARROW.
No. 441,938.　　　　　　　　　　　Patented Dec. 2, 1890.
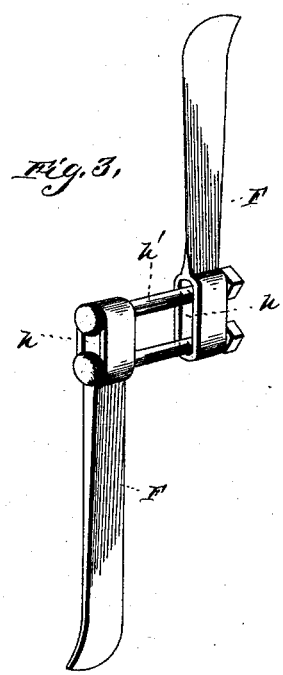
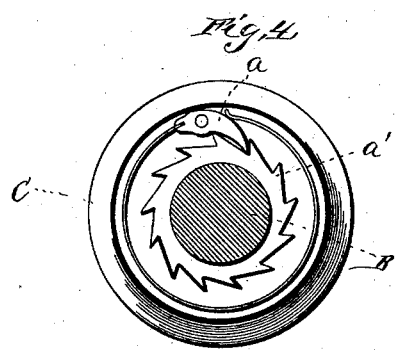
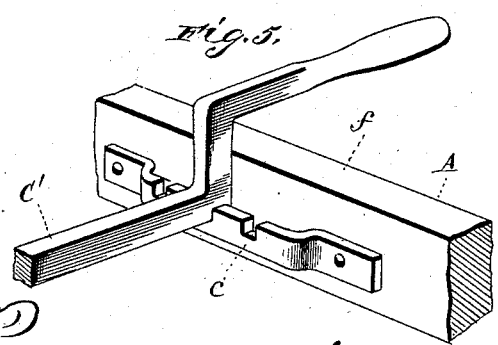

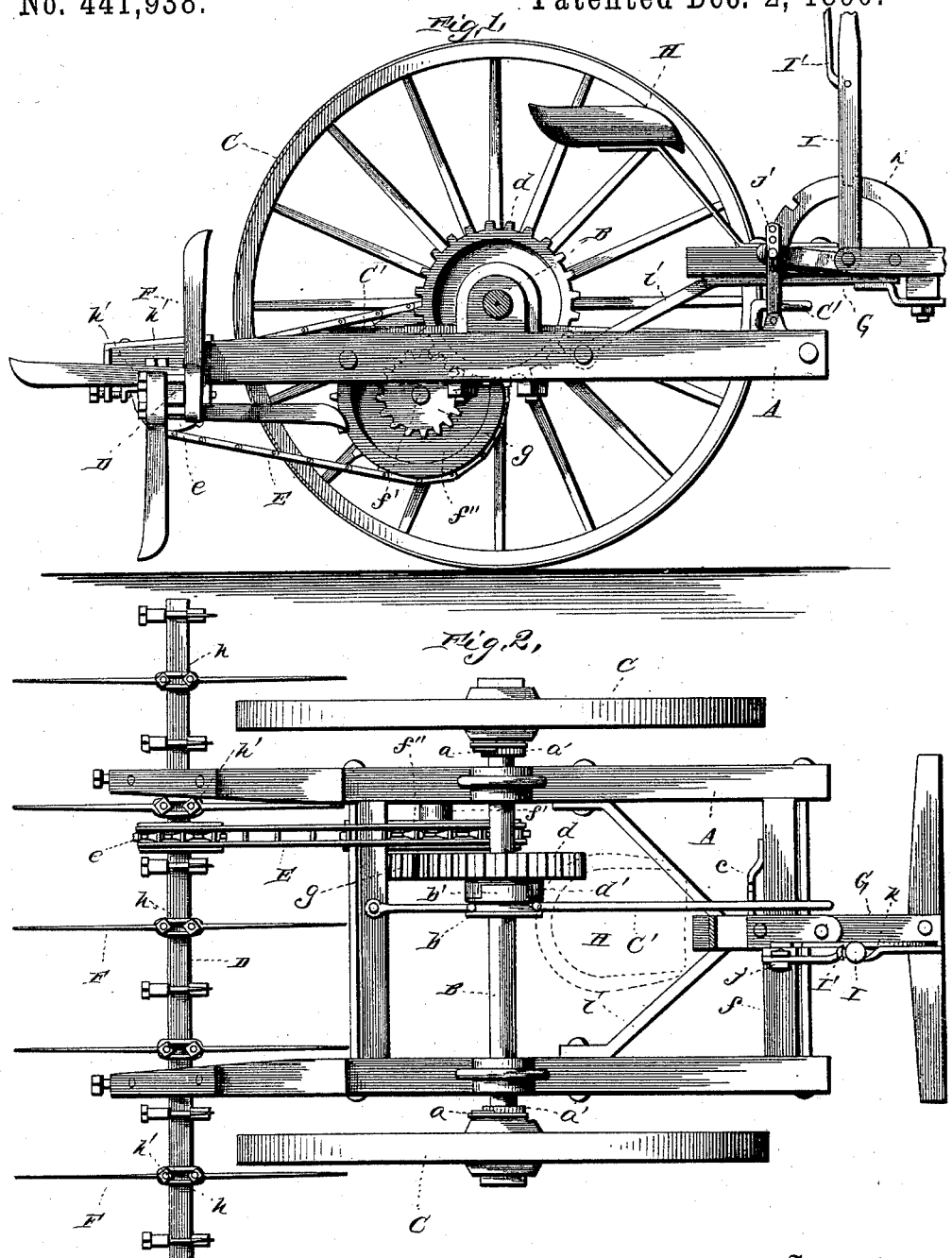

UNITED STATES PATENT OFFICE.

JAMES DAVID CLEEK, OF ABINGDON, VIRGINIA.

HARROW.

SPECIFICATION forming part of Letters Patent No. 441,938, dated December 2, 1890.

Application filed February 24, 1890. Serial No. 341,522. (No model.)

*To all whom it may concern:*

Be it known that I, JAMES DAVID CLEEK, a citizen of the United States, residing at Abingdon, in the county of Washington and State of Virginia, have invented certain new and useful Improvements in Harrows; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a side elevation with one wheel removed. Fig. 2 is a top plan view. Figs. 3, 4, and 5 are detail views.

This invention relates to certain improvements in harrows; and it consists of the novel combination and construction of parts, as will appear from the following description and accompanying illustrations.

In carrying out my invention, I employ a suitable carrying-frame A, which is borne by an axle B, having wheels C C. These wheels have, after the fashion of mower drive-wheels, a ratchet and spring-pawl connection $a$ $a'$ with the axle B, thus as the machine advances transmitting motion to the axle, but as it reverses its movement permitting the axle to remain unaffected or out of motion. The axle B has a sliding collar $b$, provided with a clutch-face $b'$, and with this collar engages a slipping-lever C', pivoted at its rear end to a cross bar or piece of the frame A, while its forward end is under the control of the driver and engages a rack $c$, applied to the inner side of the front cross piece or bar of the frame A. Also upon the axle B is arranged a loose pinion or cog-wheel $d$, having a clutch-face $d'$, engaging the clutch-face $b'$ of the sliding collar $b$ to throw the same in and out of gear.

D is a rectangular revolving bar or shaft hung in suitable boxes upon the under side of the frame A, and having a sprocket-wheel $e$, encompassed by an endless chain or belt E, also encompassing a similar wheel $f$, having its journal $f'$ supported in a suitable box on the under side of the frame A. To the wheel $f$ is secured a small cog-wheel or pinion $g$, gearing with the loose pinion or cog-wheel $d$ on the axle B. The shaft or bar D carries series of knife-shaped teeth F, arranged or connected together in pairs or twos, the knives of successive pairs or twos standing in a plane at right angles to that of the preceding ones, so as to act upon the ground one in advance of the other. The teeth or knives of each pair are themselves arranged upon and connected to opposite sides of the shaft or bar D, and point or extend in diametrically opposite directions. The inner or secured ends of the teeth or knives are each provided with an elongated slot or opening $h$, and through slots or openings of opposite teeth or knives pass parallel bolts $h'$, one upon each side of the bar or shaft D, thus connecting the teeth or knives in pairs or twos to said bar or shaft, and whereby they may be readily applied and removed as required. The knives or teeth, individually, are slightly curved and widened edgewise at their outer or acting ends, thus enabling them to effectively cut or harrow the previously plowed or prepared soil and pass through it with the least possible resistance and opportunity for adherence of dirt thereto.

G is the draft-pole or tongue, which is connected in the usual way to the frame A by a bail-like bar $i$, having its inner or rear ends pivoted to the inner sides of the said frame. Upon the draft-bar or tongue G, at its inner or rear end, is suitably mounted by a spring-support the driver's seat H. Pivoted to the side of the pole or tongue, so as to be convenient to the driver, is an L-shaped lever I, which is linked, as at $j$, to the forward end of the frame A, and which has a spring-pawl I' engaging a rack $k$, fast to the said tongue or pole, and whereby the rear end of the frame can be elevated in order to remove the harrow knives or teeth out of contact with the ground when desired.

Having thus fully described my invention, what I claim, and desire to secure by Letters Patent, is—

1. The rotary harrow having series of knives or teeth arranged in pairs, the teeth of each pair standing upon and secured to opposite sides of their carrying bar or shaft and pointing or extending in diametrically-opposite directions, the inner ends of said teeth having slots or openings and connected to said shaft or bar by parallel bolts, one upon each side of the latter and passing through said slots or openings, substantially as set forth.

2. The rotary harrow comprising the series of radial knives or teeth, arranged in pairs, the teeth of each pair standing upon and secured to opposite sides of the knife-carrying shaft, the inner ends of said teeth having slots or openings and connected together by parallel bolts, one upon each side of said shaft and passing through said slots, the carrying-frame provided with gearing, an endless belt or chain encompassing sprocket-wheels, one on the knife-carrying shaft and the other borne by said frame, the drive-wheels and their axle having spring-pawl and ratchet connection with said wheels, the loose cog-wheel or pinion and sliding collar on said axle, said collar and wheel having engaging clutch-faces, and the shipping-lever engaging said collar, substantially as specified.

In testimony whereof I affix my signature in presence of two witnesses.

JAMES DAVID CLEEK.

Witnesses:
D. A. PRESTON,
ARTHUR C. JONES.